(12) United States Patent
Heeder et al.

(10) Patent No.: US 10,079,079 B1
(45) Date of Patent: Sep. 18, 2018

(54) SYSTEMS AND METHODS FOR PROVIDING HIGHLY FLEXIBLE AND CONDUCTIVE COMPOSITE MATERIAL WITH TUNABLE PROPERTIES

(71) Applicant: Rhode Island Board of Education, State of Rhode Island and Providence Plantations, Providence, RI (US)

(72) Inventors: Nicholas Heeder, Saunderstown, RI (US); Arun Shukla, Wakefield, RI (US)

(73) Assignee: Rhode Island Board of Education, State of Rhode Island and Providence Plantations, Providence, RI (US)

( * ) Notice: Subject to any disclaimer, the term of this patent is extended or adjusted under 35 U.S.C. 154(b) by 146 days.

(21) Appl. No.: 14/727,252

(22) Filed: Jun. 1, 2015

(51) Int. Cl.
| | |
|---|---|
| *H01B 1/20* | (2006.01) |
| *H01B 1/22* | (2006.01) |
| *H01B 1/24* | (2006.01) |
| *H01B 13/00* | (2006.01) |
| *B05D 3/00* | (2006.01) |

(52) U.S. Cl.
CPC ........... *H01B 1/24* (2013.01); *H01B 13/0006* (2013.01); *H01B 13/0016* (2013.01); *B05D 3/007* (2013.01); *H01B 1/20* (2013.01); *H01B 1/22* (2013.01)

(58) Field of Classification Search
None
See application file for complete search history.

(56) References Cited

U.S. PATENT DOCUMENTS

| | | | | |
|---|---|---|---|---|
| 4,740,657 A | * | 4/1988 | Tsukagoshi | .............. H01B 1/22 174/84 R |
| 2005/0042496 A1 | * | 2/2005 | Bisara | ..................... H01B 1/24 264/104 |

FOREIGN PATENT DOCUMENTS

KR     20140030976 A   *   3/2014

OTHER PUBLICATIONS

Mordina et al. Magnetorheology of Polydimethylsiloxane Elastomer/FeCo3 Nanocomposite. J. Phys. Chem. 2014, 118, 25703 25684-25703.*

* cited by examiner

*Primary Examiner* — Tanisha Diggs
(74) *Attorney, Agent, or Firm* — Duan Wu, Esq.; Milstein, Zhang & Wu LLC

(57) ABSTRACT

A flexible, electrically conductive composite is disclosed that includes a plurality of particles of elastomeric material and a conductive material. The conductive material at least partially covers the plurality of particles of elastomeric material. A first portion of the composite has undergone a force that has deformed a first portion of the particles of elastomeric material and broken up the conductive coating material.

7 Claims, 4 Drawing Sheets

SYSTEMS AND METHODS FOR PROVIDING HIGHLY FLEXIBLE AND CONDUCTIVE COMPOSITE MATERIAL WITH TUNABLE PROPERTIES

BACKGROUND

The desire to produce light-weight, flexible, multi-functional composites has grown tremendously in recent years. Polymer (including elastomeric polymer) nanocomposites, in particular, have attracted attention in the past decades with the belief that they could become the next generation of high performance materials with multifunctional capabilities. One of the most compelling features of such nanocomposites is the ability to create a new class of materials with attributes that come both from the filler and the matrix. Having the ability to manipulate the degree and nature of the dispersion is key to the development of these types of novel composites. Many studies have documented enhancement of properties such as stiffness and strength, thermal stability, electrical and thermal conductivities, dielectric performance and gas barrier properties of polymer and elastomer composites with the incorporation of fillers.

Significant research has shown that carbon-based polymer nanocomposites demonstrate remarkable physical and mechanical properties by incorporating very small amounts of filler material. Owing to its extraordinary mechanical and physical properties, graphene appears to be a very attractive filler material for the next generation of smart materials in batteries, supercapacitors, fuel cells, photovoltaic devices, sensing platforms and other devices. Along with the aspect ratio and the surface-to-volume ratio, the distribution of filler material in a polymer matrix has been shown to directly correlate with its effectiveness in improving material properties such as mechanical strength, electrical and thermal conductivity, and impermeability. Unfortunately, providing good electrical conductivity while maintaining the desired qualities of the filler material has remained challenging. Similarly, the incorporation of conductive material into elastomeric polymer material has proved challenging due to the characteristics of the elastomeric filler material and the conductive material.

Although significant research has been performed to develop strategies to effectively incorporate nanoparticles into materials, the ability to control the dispersion and location of fillers to fully exploit their intrinsic properties remains a challenge, especially at the pilot and commercial scales. An alternate method for creating a connected pathway for conductive particles is to make segregated composites. The conductive particles within segregated composites are specially localized on the surfaces of the polymer matrix particles. When consolidated into a monolith, these conductive particles form a percolating three-dimensional network that dramatically increases the conductivity of the composite. Certain studies have revealed that highly conductive composites can be created when graphene is segregated into organized networks throughout a matrix material. Although the highly segregated networks provide excellent transport properties throughout the composite, they inevitably result in poor mechanical strength, since fracture can occur easily by delamination along the continuous segregated graphene phase. Since most multi-functional materials are required to provide excellent transport properties while maintaining sufficient mechanical strength, alternative methods of distributing graphene need to be developed.

Despite recent progresses on the electrical characterization of graphene-based segregated composites, no results have been yet provided regarding the combined electro-mechanical behavior of these highly conductive materials.

SUMMARY

In accordance with an embodiment, the invention provides a flexible, electrically conductive composite that includes a plurality of particles of elastomeric material and a conductive material. The conductive material at least partially covers the plurality of particles of elastomeric material. A first portion of the composite has undergone a force that has deformed a first portion of the particles of elastomeric material and broken up the conductive coating material.

In accordance with another embodiment, the invention provides a flexible, electrically conductive composite including an elastomeric material that has undergone a stress force, and a plurality of particles of a conductive material that are dispersed within the composite.

In accordance with a further embodiment, the invention provides a method of forming a flexible, electrically conductive composite. The method includes the steps of coating an electrically conductive material on particles of an elastomeric material, and applying a stress force on the coated elastomeric material to cause the elastomeric material to become deformed and the electrically conductive material to break into smaller sized particles.

BRIEF DESCRIPTION OF THE DRAWINGS

The following description will be further understood with reference to the accompanying drawings in which.

Figure 1:
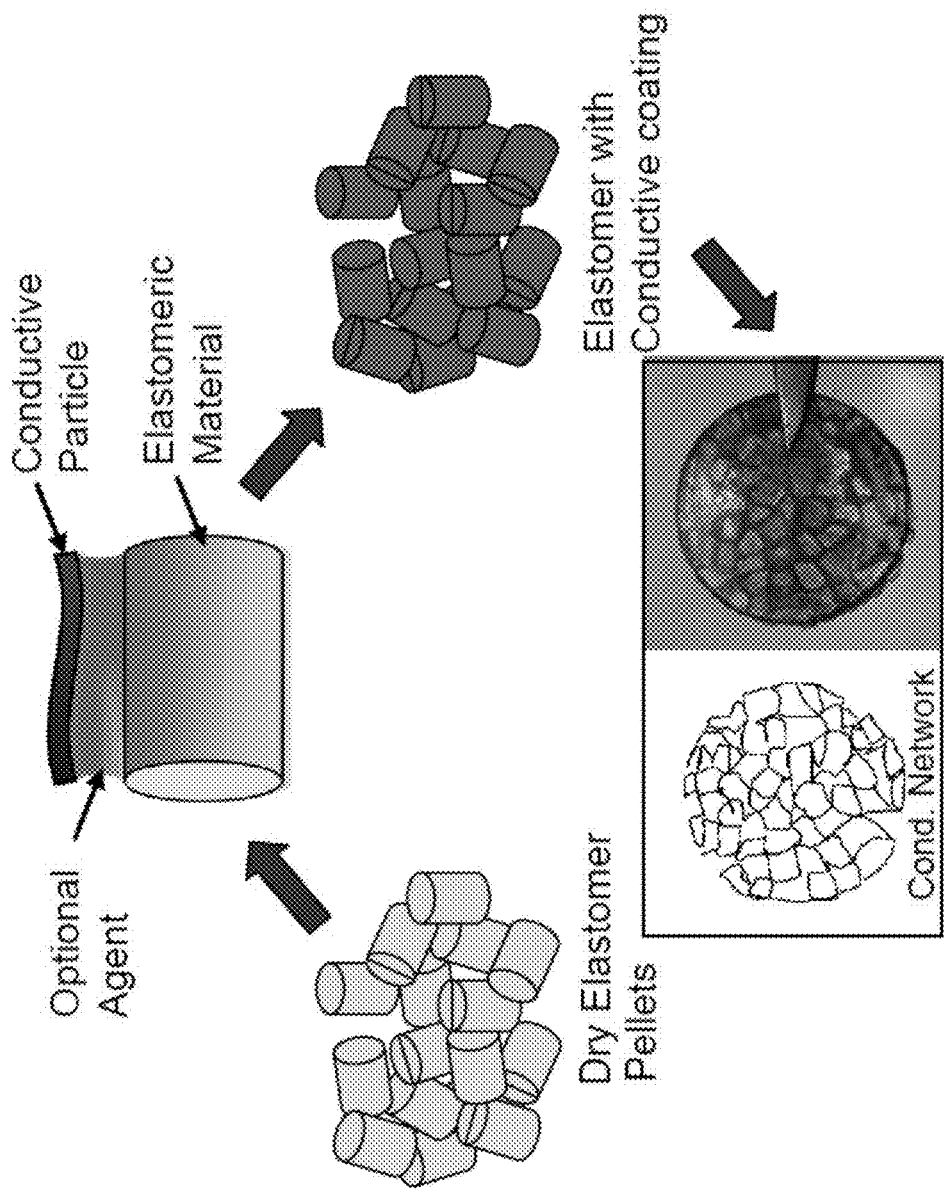
FIG. 1 shows a schematic view of the process used to provide styrene/butadiene (SBS) pellets coated with graphite nanoplatelets (GNP) in accordance with an embodiment of the present invention.

The drawings are shown for illustrative purposes only.

DETAILED DESCRIPTION

It has been discovered that a novel capillary-driven, particle-level templating technique may be used to distribute graphite nanoplatelets (GNPs) into specially constructed architectures throughout a styrene/butadiene (SBS) thermoplastic elastomer to form multi-functional composites with tailored electro-mechanical properties. By precisely controlling the temperature and pressure during a melt compression process, highly conductive composites were formed using very low loadings of graphene particles. To improve the mechanical properties, a new processing technique was developed that uses rotary shear during the compression molding process to gradually evolve the honeycomb graphene network into a concentric band structure. The rearrangement of the graphene networks allows for a higher degree of conformation and increased number of interactions between the polymer chains, thus providing increased strength in the polymeric phase. The degree of evolution from the honeycomb to the concentric band structure can be precisely determined by the chosen angle of rotation. Two types of composites, organized and shear-modified, were produced to demonstrate the electro-mechanical tailoring of the composite material. An experimental investigation was conducted to understand the effect of graphene content as well as shearing on the mechanical strength and electrical conductivity of the composites. The experimental results show that both the mechanical and electrical properties of the composites can be altered using this very simple technique and the inherent trade-off between electrical versus mechanical performance can be intelligently optimized for a given application by controlling the pre-set angle of rotary shear.

A highly conductive and flexible material with tunable mechanical and physical properties was produced. This material can be produced using a simple, inexpensive and commercially viable technique and can be intelligently optimized for specific applications. Since this novel material can provide high flexibility while still maintaining excellent transport properties, it can be used in a wide range of applications including, but not limited to, applications where high deformation is present (i.e. coatings, gaskets, tubing, adhesives, etc.).

The invention disclosed was fabricated using two steps. First, an elastomeric polymer (in pellet form) was coated with a conductive filler material by means of methods such as electrostatic adsorption, capillary interactions, etc. Next, the material was placed into a specialized molding apparatus that was used to apply a shear force along the top surface of the specimen.

The graphite nanoplatelets used may be xGnP™ Nanoplatelets (XG Sciences, USA). These nanoparticles consist of short stacks of graphene layers having a lateral dimension of ~25 lm and a thickness of ~6 nm. This thickness corresponds to approximately 18 graphene layers at a typical graphite interlayer spacing. It has been proposed that materials of this thickness (>10 layers) be referred to as exfoliated graphite, or graphite nanoplatelets for scientific classification. The same materials are sometimes marketed by suppliers as graphene nanoplatelets. The elastomeric material used may be styrene/butadiene material, which is commonly used for automobile tires. SBS pellets were used that had an average diameter of less than about 3 mm.

A two-step process was utilized to produce the GNP/SBS segregated composites. For composites consisting of less than 0.2% v/v, the desired amount of graphene platelets were measured and added directly to 7 g of dry SBS pellets. The adhesion of the graphene platelets may be accomplished by any of electrostatic adsorption or capillary interactions. As shown in FIG. 1, in certain embodiments, an optional agent such as methanol may be used to facilitate adhesion. With proper choice of materials and their surface energies, no agent may be needed.

Examples of various conductive filler materials that may be used include graphite/carbon-based materials (carbon black, graphene, graphite nanoplatelets, single walled carbon nanotubes, multi-walled carbon nanotubes, carbon fibers, fullerene, etc.), silver conductive materials (flakes/fibers), gold conductive materials (flakes), and aluminum conductive materials (flakes/fibers).

Figure 2A:
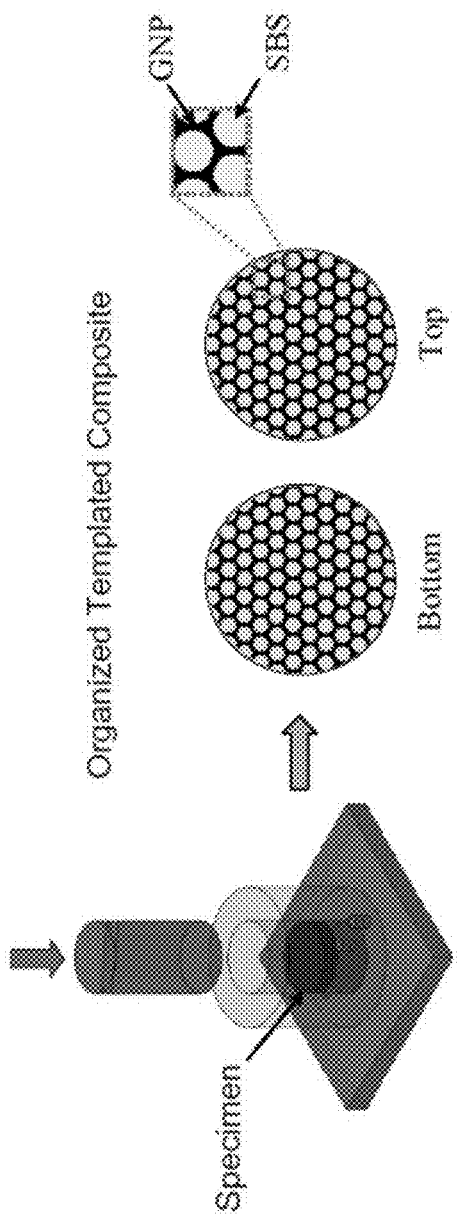
FIG. 2A shows a schematic view of a composite composed of the conductive particles distributed in an organized honey-comb structure.
Figure 2B:
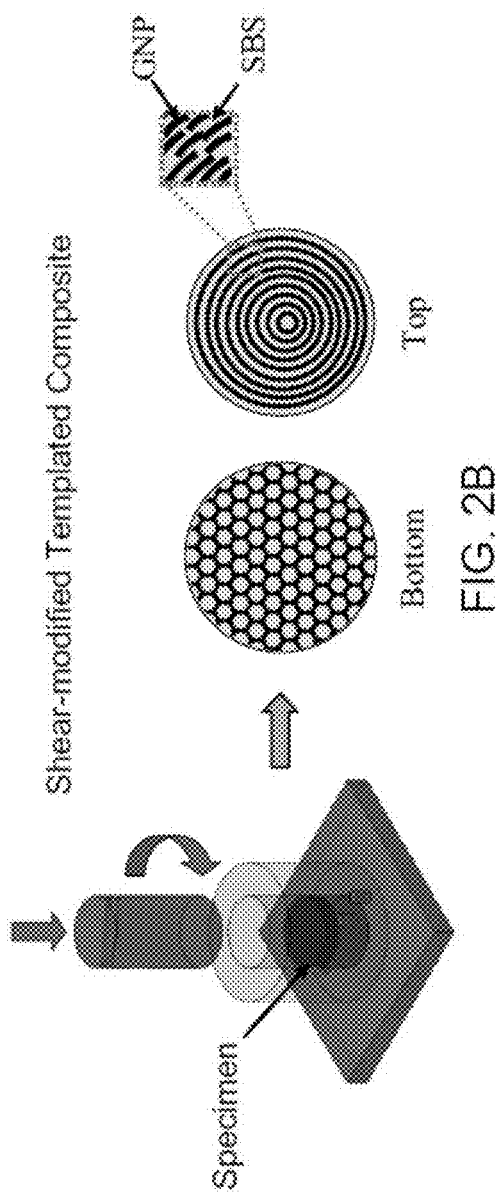
FIG. 2B shows a schematic of a composite that has the conductive particles distributed in a functionally graded pattern to provide specific mechanical and physical properties.

FIGS. 2A and 2B show two different types of composite materials that can be formed using the invention. When no shear force is used, the network of conductive particles remains highly organized. These organized networks are extremely efficient in transferring electrons, therefore making the composite highly conductive (but lack in mechanical properties). FIG. 2B shows an example of a shear-modified composite which can also be formed using the invention. The networks of conductive particles are distributed in a functionally graded architecture that results in a composite material being highly conductive while also providing sufficient mechanical properties.

During the subsequent hot melt pressing, the temperature and mold pressure are precisely controlled allowing the pellets to be consolidated into a monolith while maintaining boundaries. FIGS. 2A and 2B show a schematic of the compression molding process used to produce the segregated composites. A stainless steel mold consisting of a lower base and a plunger was heated to ~125° C. The GNP coated SBS was placed inside the cavity of the lower base and the plunger was placed on top. The temperature of both the plunger and the base mold was maintained for 20 min at which point it was hot-pressed at ~45 kN using a hydraulic press. By precisely controlling the temperature and pressure during a melt compression process, highly conductive composites were formed. This method of distributing graphene within a matrix overcomes the need to disperse the sheet-like conducting fillers isotropically within the polymer, and can be scaled up easily.

Examples of various elastomers that may be used include styrenic block copolymers (TPE-s), polyolefin blends (TPE-o), elastomeric alloys (TPE-v or TPV), thermoplastic polyurethanes (TPU), thermoplastic copolyester, thermoplastic polyamides, acrylonitrile butadiene styrene (ABS), thermoplastic elastomers (TPE), and elastometric PVC. For different elastomers, the temperatures and pressures would have to be adjusted accordingly.

Modified particle-templated composites were fabricated by incorporating a shearing technique during the melt compression process. Following the same coating process as discussed earlier, the graphene coated pellets were placed inside a modified steel mold, which was equipped with guide pins to ensure that the base remained stationary. The plunger was then placed on top of the material and heated to 160° C. while the lower base mold was heated to 125° C. and maintained for 20 min. Next, 20 MPa was applied to the plunger and then rotated to various predetermined angles. Once the desired rotation was achieved, 45 MPa was applied and held for 5 min. All shear-modified composites were fabricated with 0.3% v/v graphene platelets. By applying such a strain in the azimuthal direction on the top surface of the material, as shown in FIG. 2B, a gradient of graphene organization/orientation in the axial direction is formed which results in a composite possessing unique properties.

Figure 3:
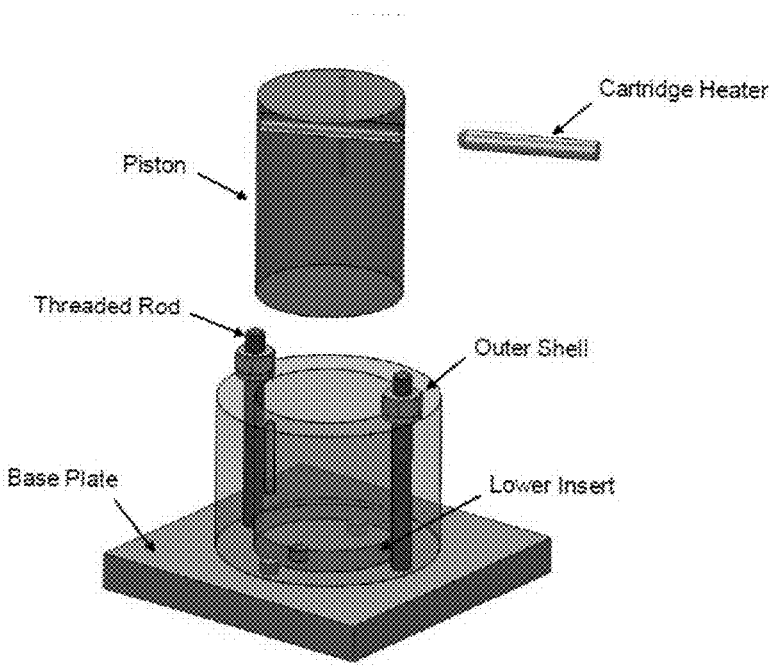
FIG. 3 shows an illustrative diagrammatic view of a compression molding apparatus in accordance with an embodiment of the present invention.

A schematic of the molding apparatus itself is shown in FIG. 3. The mold consists of a base plate, lower insert, outer shell, piston and two heating elements. Additionally, the base of the mold may be equipped with guide pins to ensure that the base of the mold remains stationary during the melt compression process. Once the material was placed in the mold, the temperature of both the base and piston was increased to a temperature slightly above the glass transition temperature of the elastomeric material being used. This temperature was maintained to achieve a constant temperature gradient throughout the material. Next, a sufficient compressive force was applied on to the top of the piston. While the force was maintained, the piston was rotated to a desired angle. By applying such a strain in the azimuthal direction on the top surface of the material, a gradient of the filler organization/orientation in the axial direction is formed which results in a composite possessing unique physical and mechanical properties.

To demonstrate this invention, the polymeric material chosen for the matrix was a styrene/butadiene (SBS) thermoplastic elastomer. The copolymer contains a total styrene weight fraction of 0.45 and was in pellet form (~3 mm in diameter). Graphite nanoplatelets (GNPs), which consists of short stacks of graphene layers having a lateral dimension of ~25 μm and a thickness of ~6 nm, was used as the filler material. Using the fixed-angle rotary shear technique during a melt compression process, the GNPs were distributed into specially constructed architectures throughout the SBS elastomer. Shear-modified composites were produced to demonstrate the electro-mechanical tailoring of the composite material. An experimental investigation was conducted to understand the effect of the rotary shear angle on the mechanical strength and electrical conductivity of the composites.

Figure 4A:
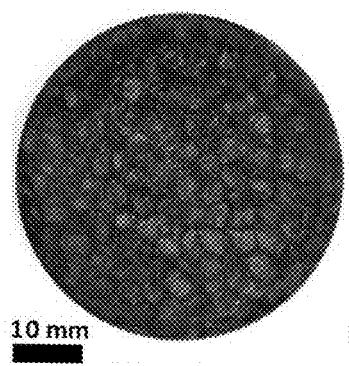
FIGS. 4A-4C show photographic images of a bottom organized surface (FIG. 4A), a top smeared surface (FIG. 4B) and a cross-section of a 0.3% v/v GNP/SBS shear modified composite showing the extent of smearing, wherein the top surface was rotated 360°.
Figure 4B:
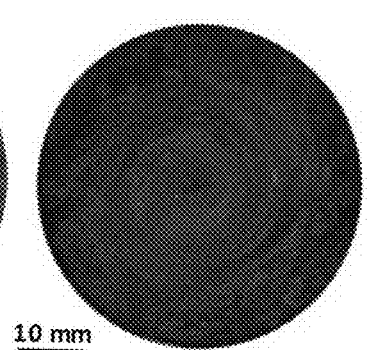
Figure 4C:

Images of a 0.3% v/v shear modified GNP/SBS specimen exhibiting a graphene network that is functionally graded in the axial direction is shown in FIGS. 4A-4C. The flexible composite exhibits a foam-like structure in which the dark wall-like structures are GNPs while the lighter domains are the SBS. The top surface of the composite exhibits a chaotic and disorganized pattern of GNP while the bottom maintains a highly organized segregated structure of GNP.

While the bottom (organized) portion provides better electrical conductivity than the top (smeared) portion, the composite in the bottom portion includes dense pathways of the conductive material that may compromise the mechanical properties of the material. While the top smeared portion is less conductive than the bottom portion, the conductivity of the top portion is still sufficient for many applications, and most significantly, the mechanical properties of the top portion are not significantly compromised due to the change in both the elastomeric material and the electrically conductive material as a result of the shear force.

Figure 5:
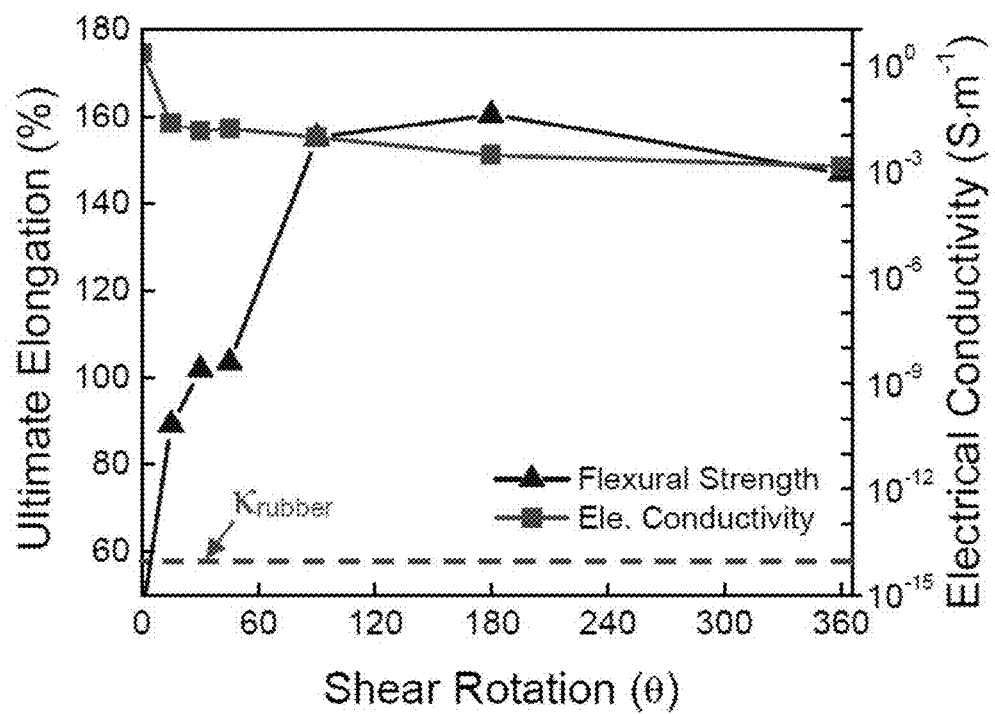
FIG. 5 shows the electro-mechanical behavior of the shear-modified GNP/SBS template composites loaded parallel to pressing.

FIG. 5 shows the normalized electro-mechanical behavior of the shear modified GNP/SBS composites as a function of shear rotation. Both the elongation to break (EB) and electrical conductivity was normalized with respect to the organized 0.3% v/v GNP composite (0° shear rotation). As discussed previously, the capillary driven coating process enables an increase in electrical conductivity of the composite by approximately 13-14 orders of magnitude as compared to pristine SBS, owing to the dense GNP coating on the SBS pellets. By applying a shear force to the top surface of the highly segregated material, a gradient of GNP organization/orientation along the sample axis is formed which results in a 270% increase in total strain to failure while only sacrificing ~2-3 orders of magnitude of conductivity. Although, the electrical conductivity decreased by two orders of magnitude, the value of $4 \times 10^{-2}$ S·m$^{-1}$ is still very high and acceptable for many applications ($\kappa_{rubber}$ ~10-14).

The experimental results show that this simple technique can be used to produce flexible composites that possess exceptional conductivity while still maintaining the salient mechanical characteristics the copolymer has to offer. In addition to providing exceptional transport properties, segregated/modified-sheared composites can provide other superior properties including barrier properties if properly distributed/oriented throughout the matrix.

Those skilled in the art will appreciate that numerous modifications and variations may be made to the above disclosed embodiments without departing from the spirit and scope of the present invention.

What is claimed is:

1. A flexible, electrically conductive composite comprising a plurality of particles of elastomeric material and an electrically conductive material, wherein the conductive material adheres to and at least partially coats the plurality of particles of elastomeric material, wherein a first portion of the composite has undergone a force that has deformed a first portion of the composite and broken up the conductive coating material and rearranged said conductive material along boundaries between the particles of the elastomeric material in at least said first portion of the composite, thereby forming an electrically conductive composite with increased mechanical strength at least in said first portion, and wherein a second portion of the composite that has not undergone the force comprises a second portion of the particles of elastomeric material at least partially coated by the conductive material such that said second portion retains better conductivity than the first portion.

2. The flexible, electrically conductive composite as claimed in claim 1, wherein said force is caused by a strain in a rotary direction.

3. The flexible, electrically conductive composite as claimed in claim 1, wherein said elastomeric material is selected from a group consisting of styrenic block copolymers (TPE-s), polyolefin blends (TPE-o), elastomeric alloys (TPE-v or TPV), thermoplastic polyurethanes (TPU), thermoplastic copolyester, thermoplastic polyamides, acrylonitrile butadiene styrene (ABS), thermoplastic elastomers (TPE), and elastomeric PVC.

4. The flexible, electrically conductive composite as claimed in claim 1, wherein said conductive material is selected from a group consisting of graphite particles, graphite nanoplatelets, carbon-based materials, silver conductive materials, gold conductive materials, and aluminum conductive materials.

5. The flexible, electrically conductive composite as claimed in claim 1, wherein said conductive material is coated onto the plurality of particles of elastomeric material by electrostatic adsorption.

6. The flexible, electrically conductive composite as claimed in claim 1, wherein said first portion of said composite is provided as an electrically conductive elastomeric article.

7. The flexible, electrically conductive composite as claimed in claim 1, further comprising an adhesion agent between the plurality of elastomeric material and the electrically conductive material.

* * * * *